United States Patent Office 3,482,631
Patented Dec. 9, 1969

3,482,631
SECONDARY RECOVERY PROCESS UTILIZING A PRE-SLUG PRIOR TO A DISPLACING FLUID
Stanley C. Jones, Littleton, Colo., assignor to Marathon Oil Company, Findlay, Ohio, a corporation of Ohio
No Drawing. Filed Dec. 26, 1967, Ser. No. 693,118
Int. Cl. E21b 43/16, 43/18
U.S. Cl. 166—273       17 Claims

ABSTRACT OF THE DISCLOSURE

Secondary-type crude oil recovery processes utilizing a displacing fluid containing electrolyte and/or a semipolar organic compound are improved by injecting previous to the displacement fluid an aqueous pre-slug containing a viscosity imparting agent, and electrolyte and/or semipolar organic compound.

BACKGROUND OF THE INVENTION

United States Patent No. 3,275,075 to Gogarty, et al. teaches the use of semi-polar organic compounds, e.g. alcohols, in displacing fluids useful in secondary-type recovery processes. United States Patent No. 3,330,343 to Tosch, et al. teaches the use of electrolytes in miscible-type displacing fluids useful in recovering oil from subterranean formations. United States Patent No. 3,324,944 to Poettmann teaches a "pre-slug" injection of a non-polar organic liquid into the formation to improve the stability of a subsequent microemulsion injection into the formation.

An electrolyte and/or a semi-polar compound is sometimes "leached" or "sorbed" from displacing fluids used in secondary-type recovery processes. It is thought that there is a tendency for equilibrium to be established by these materials at the juncture between the connate water or interstitial water within the subterranean formation and the displacing fluid. As a result, the displacing fluids lose their original character.

Applicant has discovered that by injecting a pre-slug of an aqueous liquid containing electrolyte and/or semipolar organic compound into the subterranean formation, the problem mentioned above can be alleviated. However, an additional improvement can be made by incorporating a viscosity imparting agent into the pre-slug. The effect of the viscosity imparting agent to the pre-slug is (1) to saturate adsorption sites on the strata sands to insure that viscosity imparting agents in the slugs following the displacing fluid will not be "leached" from these slugs causing them to change their character and (2) to impart a high viscosity (relative to the connate water) to the pre-slug to insure a more stable displacement of the connate water. It is postulated that the viscosity imparting agent tends to flocculate fine clay particles in the sand—thus reducing the surface area of the clays which might otherwise adversely affect the process. As a result of incorporation of the viscosity imparting agent into the pre-slug, improved crude oil recovery is realized.

DESCRIPTION OF THE INVENTION

This invention is applicable to secondary-type recovery, including tertiary recovery, wherein a displacing fluid is moved through a subterranean formation to displace crude oil therefrom. The displacing fluid can be any fluid which will effectively recover or displace crude oil from the subterranean formation. Examples of such fluids include miscible-type displacing fluids (e.g. alcohols), water- and oil-external micellar dispersions (this includes micellar solutions) and water- and oil-external emulsions (also known as macroemulsions). Preferably, the mobility of the displacing fluid can be about equal to or less than that of the formation fluids.

Preferably the displacing fluid is a micellar dispersion. The term "micellar dispersion" as used herein is meant to include "microemulsion" [Schulman and Montagne, Annals of the New York Academy of Sciences, 92, pp. 366–371 (1961)], oleopathic hydro-micelles [Hoar and Schulman, Nature, 152, p. 102 (1943)], "transparent" emulsions (Blair, Jr. et al., United States Patent No. 2,356,205), and micellar solution technology taught in C. G. Sumner, Clayton's, The Theory of Emulsions and Their Technical Treatment, 5th edition, pp. 315–320 (1954) and micellar solutions, examples of the latter being defined in United States Patent Nos. 3,254,714; 3,275,075; 3,301,325; and 3,307,628. Additional examples of micellar dispersions are taught in United States Patent Nos. 3,330,344 and 3,348,611 to Reisberg.

The micellar dispersions are composed essentially of a hydrocarbon, an aqueous medium and a surfactant. Semi-polar organic compounds and electrolytes can also be incorporated into the micellar dispersion. Examples of hydrocarbon include crude oil, partially refined fractions thereof, and refinements of crude oil. The aqueous medium can be soft water, brackish water, or brine water. Examples of useful surfactants with micellar dispersions can be found in United States Patent No. 3,275,075 to Gogarty, et al. The surfactant can be cationic, nonionic and anionic surface active compounds. A particularly useful surfactant is an alkyl aryl sulfonate of an alkali cation (e.g. potassium, sodium and ammonium) more commonly known as petroleum sulfonates or as alkyl aryl naphthenic sulfonates.

Semi-polar compounds, also known as co-surfactants and co-solubilizers, useful with the displacing fluids (especially micellar dispersions) include alcohols, amines, esters, ketones, and aldehydes containing from 1 up to about 20 or more carbon atoms. Preferably, the semipolar organic compound is an alcohol, examples include ethanol, isopropanol, n- and isobutanol, the amyl alcohols such as n-amyl alcohol, 1- and 2-hexanol, 1- and 2-octanol, the decyl alcohols, alkaryl alcohols such as p-nonyl phenol and alcoholic liquors such as fusel oil.

Electrolytes useful with the displacing fluids (especially micellar dispersions) include inorganic bases, inorganic acids, inorganic salts, organic bases, organic acids, and organic salts. Preferably the electrolytes are inorganic bases, inorganic acids, and inorganic salts, e.g. sodium hydroxide, hydrochloric acid, sulfuric acid, sodium chloride, sodium sulfate, and sodium nitrate. Other useful electrolytes can be found in United States Patent No. 3,330,343 to Tosch, et al.

The semi-polar organic compound and electrolyte useful in the pre-slug are defined as those in the above two paragraphs. The viscosity imparting agent useful in the pre-slug can be any agent which is compatible with the diluent within the pre-slug, compatible with the semi-polar organic compound and electrolyte and which imparts viscosity characteristics to the pre-slub. Examples of viscosity imparting agents include high molecular weight polymers such as partially hydrolyzed polyacrylamides, polysaccharides, carboxy methyl cellulose, and similar materials. Where the displacing fluid is a micellar dispersion, the preferred viscosity imparting agent is a partially hydrolyzed polyacrylamide (e.g. the Pusher products marketed by Dow Chemical Co.), or like material.

As mentioned previously, incorporating the viscosity imparting agent into the pre-slub is beneficial to the secondary-type recovery process. However, the viscosity of the pre-slug should not be upgraded to the point where a largely unfavorable mobility exists. Such an unfavorable condition will depend upon the particular formation, the particular crude oil being recovered, the type of displacing fluid and mobility of the displacing fluid.

Preferably, the mobility of the pre-slug should be about equal to or less than that of the mobility of the formation fluids (crude oil plus connate water) within the reservoir formation. More preferably, the mobility of the pre-slug can be at least about 80% of the mobility of the formation fluids for fairly homogeneous type reservoirs and from about 80% to about 10% of the mobility of the formation fluids for a more heterogeneous type reservoir.

The amount of viscosity imparting agent (also identified as mobility imparting agent) incorporated into the pre-slug depends on the permeability of the formation, the mobility of the agent itself; the mobility of the formation fluids, etc. Examples of useful amounts include from about 25 to about 1000 p.p.m. and more preferably from about 50 to 250 p.p.m. wherein the mobility imparting agent is a high molecular weight partially hydrolyzed polyacrylamide. However, larger amounts are useful where the strata is very permeable and active sites are plentiful. The semi-polar compound can be present in amounts from about 0.001% up to and greater than 5% by volume of the pre-slug. From about 0.01% up to about 4 weight percent of the electrolyte can be incorporated in the pre-slug. Preferably, the pre-slug contains enough semi-polar compound and/or electrolyte to establish equilibrium conditions between the back portion of the pre-slug and the front portion of the displacing fluid, where the latter contains a semi-polar compound and/or an electrolyte.

After the pre-slug and displacing fluid are injected into the subterranean formation, there is injected a drive mobility buffer slug to move the displacing fluid through the formation. This is preferably a fluid containing a viscosity imparting agent which will impart a favorable mobility condition to the recovery process. Preferably, the mobility of the slug will be about that or less than about that of the displacing fluid. A portion of the mobility buffer (i.e. at least about 5%) can increase in mobility from about that of the displacing fluid to about that of the water drive. The mobility buffer slug can be composed of an organic material (e.g. liquefied petroleum gases) or it can be a water- or oil-external emulsion but is preferably water containing a water soluble viscosity imparting agent, such as a high molecular weight partially hydrolyzed polyacrylamide. The slug should have sufficient mobility to protect the displacing fluid from invasion by a subsequent water drive. After the slug is injected into the formation, sufficient water drive is injected into the formation to move the displacing fluid through the formation to displace crude oil therefrom. Preferably the viscosity imparting agent is the same as that used in the pre-slug but should be compatible with the displacing fluid and ions in the subterranean formation.

The amount of pre-slug injected into the formation will depend upon the particular characteristics of the formation, the composition of the displacing fluid, and the amount of displacing fluid injected into the formation. Generally, from about 1% up to about 30% and preferably from about 2% up to about 10% formation pore volume is sufficient. The amount of displacing fluid needed will also depend upon the formation and the characteristics of the formation fluids, but from about 1% up to about 20% formation pore volume is sufficient where micellar dispersions are used as the displacing fluid.

The following examples are submitted to teach specific working embodiments of the invention. The invention is not to be limited by these examples but equivalents to these examples are intended to be incorporated into the ambit of the invention. Unless otherwise specified, percents are based on volume.

EXAMPLE 1

Unfired Berea sandstone cores 4 feet long by 2 inches in diameter having characteristics indicated in Table I are initially saturated with water treated from the Stephens field, Buckrange sand, located in Columbia and Quachita Counties, Arkansas (the water contains about 42,000 p.p.m. of dissolved solids, hereafter identified as Stephens water) and are then flooded with oil obtained from the Stephens field (a black, sweet crude having a viscosity of 11.2 cp. at 114° F. and hereinafter identified as Stephens oil). The oil saturation of the cores is indicated in Table I. The cores are first flooded with 10% formation pore volume of a pre-slug, compositions of these pre-slugs indicated in Table I. Thereafter, the cores are injected with 10% formation pore volume of a micellar dispersion composed of 54.8% kerosene, 8.92% of sodium petroleum sulfonate, 1.96% of isopropanol, 34.31% of distilled water and 1.235 weight percent of sodium sulfate. Viscosity of the micellar dispersion is 10.7 cp. at 114° F. determined on a Brookfield Viscometer run at 6 r.p.m. Flooding of the cores is effected at 114° F. Thereafter, the cores are injected with 1.2 pore volumes of a pusher slug composed of 500 p.p.m. of No. 530 Pusher (a high molecular weight partially hydrolyzed polyacrylamide marketed by Dow Chemical Company), 1,000 p.p.m. of NaCl and 50 p.p.m. of NH$_4$SCN. Flooding of the cores is effected at 114° F., the results are indicated in Table I:

TABLE I

| Sample | Core Characteristics | | | Pre-Slug Composition | | | Percent Recovery of Crude Oil in the Core | Percent Increased Oil Recovery |
|---|---|---|---|---|---|---|---|---|
| | Effective Porosity (Percent) | Permeability (md.) | Oil Saturation (Percent) | #530 Pusher (p.p.m.) | NaCl (p.p.m.) | NH$_4$SCN (p.p.m.) | | |
| A | 18.9 | 241 | 64.1 | | 5,000 | | 92 | |
| B | 19.7 | 167 | 64.4 | 200 | 5,000 | 50 | 98 | 8.7 |

EXAMPLE 2

Unfired Berea sandstone cores 4 feet long by 2 inches in diameter having characteristics indicated in Table II are initially saturated with distilled water containing 16,500 p.p.m. of NaCl. The cores are then saturated with oil taken from the Wilkin field in Illinois (a sweet, black crude oil having a viscosity of 9.0 cp. at 72° F.). The cores are first injected with indicated percent pore volumes of a pre-slug having a composition as indicated in Table II. Following the pre-slug, there is injected a miscible-type displacing slug composed of:

Samples A and D: 54.8% of kerosene; 8.92% of sodium petroleum sulfonate; 1.96% of isopropanol; 34.31% of distilled water; 1.235 weight percent of sodium sulfate.

Samples B and C: 57.17% of straight-run gasoline; 7.5% sodium petroleum sulfonate; 0.5% isopropanol; 34.83% distilled water; 1.754 weight percent sodium sulfate.

Finally, a pusher slug is injected into the cores, the compositions and percent formation pore volumes used in each sample being:

Sample A and D: 1.1 pore volumes composed of 500 p.p.m. of No. 530 Pusher; 1,000 p.p.m. of NaCl and 50 p.p.m. of NH$_4$SCN.

Sample B: 1.1 pore volumes composed identical to the above except containing 500 p.p.m. of NaCl.

Sample C: 40% formation pore volume composed of 750 p.p.m. No. 530 Pusher; 500 p.p.m. of NaCl and 50 p.p.m. of NH$_4$SCN followed by 70% formation pore volume of distilled water containing 500 p.p.m. of NaCl.

The results of the flooding tests are indicated in Table II:

TABLE II

| Sample | Core Characteristics | | | Pre-Slug | | | | Percent Formation Pore Volume of Displacing Fluid Injected | Percent Crude Recovery of Crude Oil in core |
|---|---|---|---|---|---|---|---|---|---|
| | Effective Porosity (percent) | Permeability (md) | Oil Saturation (percent) | Percent Formation Pore Volume | #530 Pusher (p.p.m.) | NaCl (p.p.m.) | NH₄SCN (p.p.m.) | | |
| A | 19.0 | 82.7 | 58.1 | 11.44 | 200 | 5,000 | 50 | 10 | 87 |
| B | 18.1 | 148.2 | 60.9 | 10.0 | 200 | 25,000 | 50 | 10 | 82 |
| C | 18.5 | 116.5 | 58.5 | 10.0 | 200 | 25,000 | 50 | 10 | 87 |
| D | 18.1 | 176.4 | 61.3 | 11.44 | 200 | 5,000 | 50 | 10 | 89 |

EXAMPLE 3

Unfired Berea sandstone cores having characteristics indicated in Table III are treated as described in Example 1. The cores are injected with 10% formation pore volume of a pre-slug composed of 200 p.p.m. of No. 530 Pusher, 5,000 p.p.m. of NaCl and 50 p.p.m. of NH₄SCN. Thereafter, the cores are injected with the miscible-type slug identified in Example 1, the percent formation pore volumes are indicated in Table III. Then, the cores are injected with pore volumes of a pusher slug composed of 500 p.p.m. of No. 530 Pusher, 1,000 p.p.m. of NaCl and 50 p.p.m. of NH₄SCN. The flooding tests are effected at ambient temperature, results of the tests are indicated in Table III:

TABLE III

| Sample | Core Characteristics | | | Percent Formation Pore Volume of Miscible-Type Slug Injected | Percent Recovery of Crude Oil in Core |
|---|---|---|---|---|---|
| | Effective Porosity (Percent) | Permeability (md.) | Oil Saturation (Percent) | | |
| A | 19.9 | 260 | 69.1 | 10 | 94 |
| B | 19.7 | 163 | 63.4 | 10 | 100 |
| C | 19.2 | 215 | 62.8 | 10 | 100 |
| D | 19.6 | 198 | 64.3 | 20 | 99 |
| E | 19.6 | 190 | 66.0 | 40 | 96 |

What is claimed is:

1. In a process for the recovery of crude oil from oil-bearing subterranean formations wherein a displacing fluid is injected into the formation through at least one injection means to displace crude oil toward at least one production means, the process comprising injecting into the subterranean formation a pre-slug comprised of a mobility imparting agent in a solvent therefor; thereafter injecting into the formation a displacing fluid selected from the group consisting of miscible-type displacing fluids, water- and oil-external micellar dispersions and water- and oil-external emulsions and moving the pre-slug and displacing fluid through the formation and recovering the crude oil through the production means.

2. The process of claim 1 wherein the pre-slug is comprised of a viscosity imparting agent in solution and compound(s) selected from the group consisting of semi-polar organic compound, electrolyte, or mixtures thereof.

3. The process of claim 1 wherein the displacing fluid is a micellar dispersion.

4. The process of claim 3 wherein the micellar dispersion is comprised of hydrocarbon, aqueous medium, and surfactant.

5. The process of claim 1 wherein a mobility buffer slug is injected into the subterranean formation after the displacing fluid.

6. The process of claim 5 wherein the mobility buffer has a mobility about equal to or less than that of the displacing fluid.

7. The process of claim 5 wherein a portion of the mobility buffer slug is characterized as having mobilities increasing from about that of the displacing fluid to about that of subsequent water drive.

8. In a process for the recovery of crude oil from oil-bearing subterranean formations wherein displacing fluids are injected into the formation through at least one injection well to displace the crude oil toward at least one production well, the process comprising:

(1) injecting from about 1% to about 30% formation pore volume of a pre-slug containing a mobility imparting agent and semi-polar compound, electrolyte, or mixtures thereof, (2) injecting from about 1% to about 20% formation pore volume of a micellar dispersion, (3) injecting a mobility buffer slug into the subterranean formation, and (4) injecting sufficient water drive into the subterranean formation to move the micellar dispersion through the subterranean formation and recovering crude oil.

9. The process of claim 8 wherein the pre-slug is substantially aqueous.

10. The process of claim 8 wherein the pre-slug has a mobility within the range of from about 80% down to to about 80% of the mobility of formation fluids in a homogeneous type reservoir.

11. The process of claim 8 wherein the pre-slug has a mobility within the range of from about 80% down to about 10% of the mobility of formation fluids in a heterogeneous type reservoir.

12. The process of claim 8 wherein the micellar dispersion is comprised of hydrocarbon, aqueous medium, and at least about 4% by volume of a surfactant.

13. The process of claim 12 wherein the micellar dispersion contains semi-polar organic compound.

14. The process of claim 12 wherein the micellar dispersion contains electrolyte.

15. The process of claim 8 wherein the micellar dispersion has a mobility about equal to or less than that of the subterranean formation fluids.

16. The process of claim 8 wherein the mobility buffer has a mobility about equal to or less than that of the micellar dispersion.

17. The process of claim 8 wherein the mobility buffer slug is an aqueous slug.

References Cited

UNITED STATES PATENTS

| 2,827,964 | 3/1958 | Sandiford | 166—9 |
| 3,039,529 | 6/1962 | McKennon | 166—9 |
| 3,076,504 | 2/1963 | Meadors et al. | 166—9 |
| 3,261,399 | 7/1966 | Coppel | 166—9 |
| 3,266,570 | 8/1966 | Gogarty | 166—9 |
| 3,297,084 | 1/1967 | Gogarty et al. | 166—9 |
| 3,330,344 | 7/1967 | Reisberg | 166—9 |

STEPHEN J. NOVOSAD, Primary Examiner

U.S. Cl. X.R.

166—275

PO-1050
(5/69)

UNITED STATES PATENT OFFICE
CERTIFICATE OF CORRECTION

Patent No. 3,482,631          Dated December 9, 1969

Inventor(s) Stanley C. Jones

It is certified that error appears in the above-identified patent and that said Letters Patent are hereby corrected as shown below:

| | |
|---|---|
| Column 2, line 57: | Delete "pre-slub" and insert --pre-slug--. |
| Column 2, line 59: | Delete "pre-slub" and insert --pre-slug--. |
| Column 2, line 59: | Insert --increased-- before the words "viscosity characteristics". |
| Column 2, line 68: | Delete "pre-slub" and insert --pre-slug--. |
| Column 2, line 71: | Insert --condition-- between the words "mobility" and "exists". |
| Claim 10, line 3: | Delete "from about 80% down to about 80% and insert the following: --from about equal to down to about 80%--. |

SIGNED AND SEALED
JUN 2 1970

(SEAL)
Attest:

Edward M. Fletcher, Jr.
Attesting Officer

WILLIAM E. SCHUYLER, JR.
Commissioner of Patents